Nov. 28, 1950  R. A. ROAD  2,531,948
METER RESET DEVICE
Filed Aug. 23, 1947

Inventor
Richard A. Road
By:-
Louis Robertson  Atty

Patented Nov. 28, 1950

2,531,948

UNITED STATES PATENT OFFICE 2,531,948

METER RESET DEVICE

Richard A. Road, West Lafayette, Ind., assignor to Duncan Electric Manufacturing Company, La Fayette, Ind., a corporation of Illinois Application August 23, 1947, Serial No. 770,322

5 Claims. (Cl. 116—129)

According to one system of billing for electric power, demand meters are required. Combined watthour and demand meters have been common heretofore. In these a register indicates the energy consumption in watthours and is read by the meter reader in the usual way. In addition, a sweep hand points to a figure indicating the maximum demand during the billing period. The meter reader notes this figure and then must return the sweep hand or maximum demand pointer to zero or to the position of the momentary demand.

The present invention relates particularly to the devices for resetting the demand indicator at the end of a billing period. It is desirable to have this resetting device as simple as possible and still have it relatively foolproof. It must include some provision for sealing it, as with the conventional twisted wire and lead slug. According to the present invention a very simple sealing device is provided which nevertheless is so constructed that it must be returned to an idle position in order to insert the sealing wire. Furthermore, movement of the sealing device is limited to a predetermined arc so as to protect the reset arm. This reset arm is preferably made in the form of a fairly delicate spring so as to remove the danger of damage to other parts through its operation, and to minimize the likelihood that the reset button will be so operated as to cause the demand pointer to spring up-scale from the zero position when the knob is suddenly released. A very simple construction is provided for securing the reset arm at a predetermined angularity with respect to the movement-limiting pin.

Additional objects and advantages of the invention will be apparent from the following description and from the drawings, in which.

Figure 1:
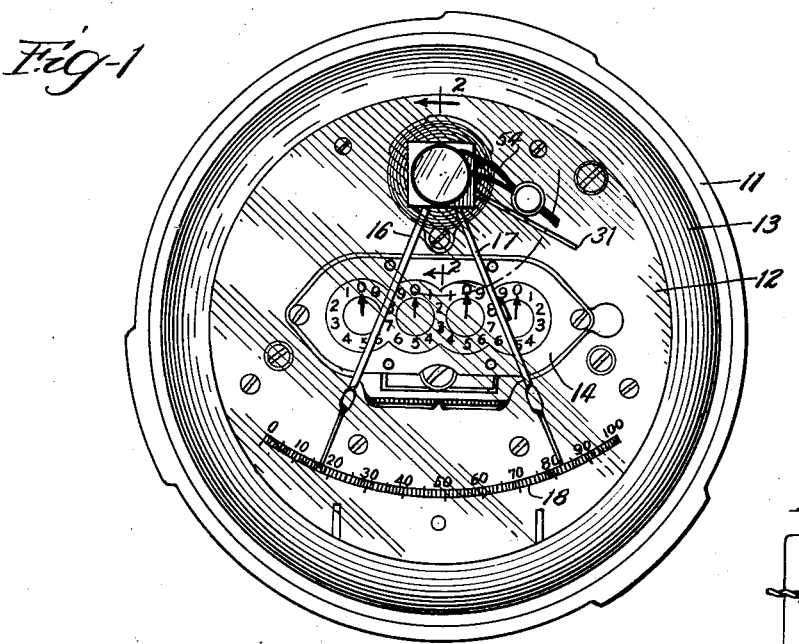
Figure 1 is a front view of a meter embodying the present invention.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

The invention has been illustrated in conjunction with a meter including a meter base 11 which may be of the socket type as illustrated, or of any other type, a meter mechanism 12 and a glass cover 13. The meter mechanism 12 may include a conventional watthour meter mechanism for driving a register 14 and a suitable demand meter apparatus for operating a momentary demand indicator or pusher 16. The pusher 16 pushes the maximum demand indicator or pointer 17 ahead of it to the highest scale reading reached by the pusher 16. The maximum demand indication can be determined by reading the position of the pointer 17 on a scale 18.

Figure 2:
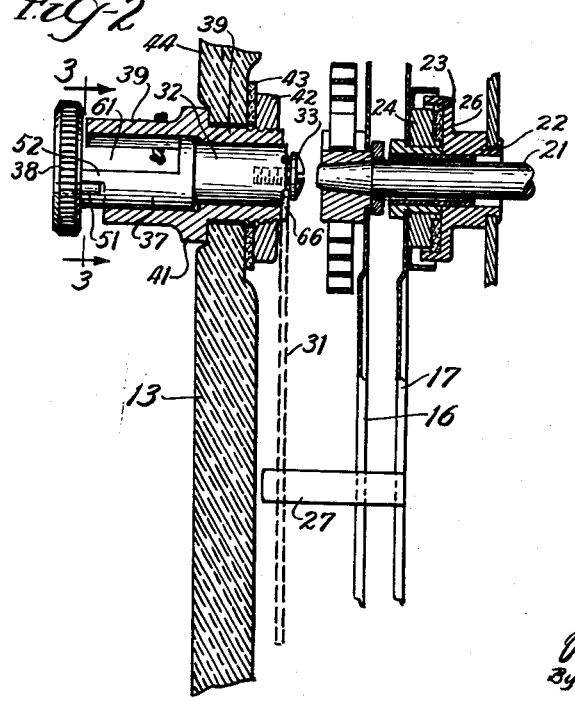
Fig. 2 is a fragmentary sectional view taken approximately on the line 2—2 of Fig. 1.
Figure 4:
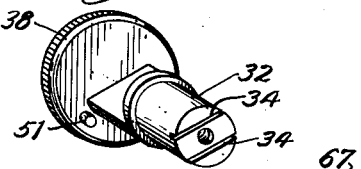
Fig. 4 is a perspective view showing the reset knob and shank.

As seen best in Fig. 2, the momentary demand pointer 16 is carried by a shaft 21 which may be the shaft of a thermal type demand meter. The maximum demand pointer 17 may be rotatively carried by a stationary hub 22. Movement of the maximum demand pointer 17 is preferably slightly dampened by means of a packing 23 of silicone stopcock grease which lies between a hub 24 rigid with the pointer 17 and a cup 26 rigid with a hub 22.

The maximum demand pointer 17 may bear an upturned finger 27 by which the maximum demand pointer 17 is moved. Thus the momentary demand pointer 16 or pusher will bear against one face of the finger 27 to push the maximum demand pointer 17 up-scale. A reset arm 31 will bear against the other face of finger 27 to push the maximum demand pointer 17 back toward zero at the end of a billing period. The present invention is concerned primarily with the reset arm 31 and the manual device for moving it.

Construction of reset device

Figure 3:
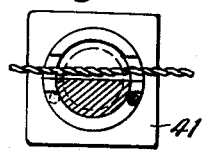
Fig. 3 is a fragmentary sectional view taken approximately on the line 3—3 of Fig. 2.
Figure 5:
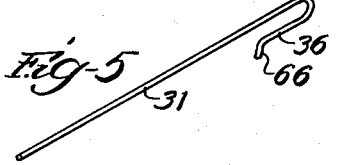
Fig. 5 is a perspective view of the reset arm.
Figure 6:
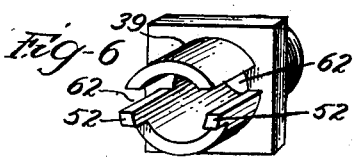
Fig. 6 is a perspective view of the bushing for receiving the device of Fig. 4.

The reset arm 31 is preferably formed of a simple length of spring wire bent to the shape shown in Fig. 5. It is secured to the end of a reset spindle 32 by means of a screw 33. The angular position of arm 31 with respect to spindle 32 is determined by grooves 34 in which the arm 31 and its tail 36 are received. Spindle 32 is part of a shank 37 which carries knob 38. The shank 37 and spindle 32 are rotatively carried within a bushing 39. The bushing 39 is provided with a flange 41 which bears on the outside of the glass cover 13. A nut 42 is threaded on the inner end of the bushing 39 and is tightened against the cover 13 or interposed washer 43. The flange 41 is preferably square, as seen in Fig. 3, or has some other out-of-round shape. It rests in a correspondingly shaped socket 44 formed in glass cover 13, thus securely preventing the bushing 39 from turning.

Angular movement of spindle 32 with respect to bushing 39 is limited by a pin 51 which has a press-fit in a hole in knob 38. The pin 51 engages stops 52 formed on bushing 39.

It is important that after the reset arm 31 has been used for pushing the maximum demand pointer 17 down-scale, it be returned to an out-of-the-way position, such as that shown in Fig. 1. This is ensured by so constructing the hub 39 and shank 52 that the conventional sealing wire 54 can be inserted only when the reset arm 31 has been moved out of the way. Thus in the illustrated form the shank 37 is cut away at 61 to an axial plane. The bushing 39 is provided with slots 62 which are also both spaced on one side of an axial plane. Accordingly, one or the other of slots 62 is closed by shank 37 at all times except when the shank is in such an angular position that the reset arm 31 will be approximately in the position shown in Fig. 1.

The reset arm 31 is preferably made of a fairly light spring. No. 24 B & S gauge (0.0201 diameter) phosphor-bronze wire, spring tempered, has been found satisfactory.

One advantage of the considerable flexibility in reset arm 31 is that it cannot force the parts beyond their range of movement and cause damage. Another advantage is that it tends to minimize the likelihood that the meter reader will cause the maximum demand pointer 17 to bounce up-scale from the zero position. In the past it has been possible for this to happen when the reset knob was turned forcefully in the down-scale position and suddenly released. The bounce-up can be more dependably prevented if sufficient friction is built into the reset device so that the bounce-up force available from spring 31 is inadequate to produce a bounce-up. This friction may be provided, for example, by having the arm 31 or the tip 66 of its tail bear against the end of hub 39. To this end the tip 66 may be given a set to one side so that it will reach out to contact the end or edge of bushing 39 with resilient pressure, even though the main part of reset arm 31 is spaced slightly from bushing 39. Whether the tip 66 is given this particular set or not, it is preferably positioned angularly with respect to the turned-back tail 36 of reset arm 31 so as to ensure proper positioning of the reset arm longitudinally in the grooves 34. It is desirable that both the tip 66 and the connecting portion 67 project beyond the spindle 32 so that they will cooperate to prevent axial movement of the spindle 32 outwardly from the bushing 39. In fact, this simple method of securing the spindle 32 in place is one of the features of the invention. The single screw 33 serves both to secure the reset arm 31 and, with the help of this reset arm, hold the spindle 32 in place.

From the foregoing it is seen that a very simple type of reset device has been provided which is virtually fool-proof in use. It is inexpensive to manufacture and install and easy to operate.

I claim:

1. A reset device for maximum demand meters including a bushing adapted to be secured to a meter cover, a reset knob, a spindle and shank by which the knob is carried and which extends through the bushing and which as groove portions on its inner end spaced laterally from each other, and a reset arm secured to the spindle at the inner end therof, said reset arm comprising a spring wire member having its spindle-engaging end doubled back upon itself, both the main wire member and the doubled-back portion resting in grooves in the spindle, the reset arm being shaped to match the shape of the groove portions only when positioned in the groove portions so that the doubled-back portion projects from the spindle in both directions longitudinally of the groove portions to secure the spindle within the bushing.

2. A reset device for meters including a bushing adapted to extend through the meter housing, a spindle adapted to be pivotally received by the bushing and including a manual operating portion, means for securing a reset member at a structurally predetermined angular position with respect to the spindle, and structures on the spindle and the bushing cooperating for limiting the angular movement of said reset member to a safe range and for providing a slot for sealing wire open through the spindle and bushing when said reset member is adjacent one end of said range only.

3. A reset device for meters including a bushing adapted to extend through the meter housing, a spindle adapted to be pivotally received by the bushing and including a manual operating portion, means for securing a reset member at a structurally predetermined angular position with respect to the spindle, and structures on the spindle and the bushing cooperating for limiting the angular movement of said reset member and for providing a slot for sealing wire open through the spindle and bushing when said reset member is adjacent one end of said range only.

4. The combination of a maximum demand indicator and a reset device therefor, said device including a resilient member operable for resetting the maximum demand indicator and a manually operable device for operating the resilient member, said manually operable device having sufficient friction therein resisting its movement so that the force available through said resilient member is inadequate to overcome said friction under conditions which will cause a jump-up of the maximum demand indicator, and structures on the spindle and the bushing cooperating for limiting the angular movement of said reset member to a safe range.

5. The combination of a maximum demand indicator and a reset device therefor, said device including a member operable for resetting the maximum demand indicator, a pusher for advancing the maximum demand indicator and a manually operable device for operating the resetting member, said manually operable device having sufficient friction therein resisting its movement so that when the reset device is suddenly released while the resetting member is pressing the maximum demand indicator against the pusher with such force that the pusher tends to advance the maximum demand indicator, the friction will prevent the pusher from advancing the maximum demand indicator past the position at which the pusher comes to rest.

RICHARD A. ROAD.

REFERENCES CITED

The following references are of record in the file of this patent:

UNITED STATES PATENTS

| Number | Name | Date |
| --- | --- | --- |
| 1,397,518 | Hem | Nov. 22, 1921 |
| 1,686,635 | Mylius et al. | Oct. 9, 1928 |
| 2,016,797 | Burn et al. | Oct. 8, 1935 |
| 2,136,216 | Martin | Nov. 8, 1938 |
| 2,171,183 | Lamb | Aug. 29, 1939 |

Certificate of Correction

Patent No. 2,531,948 November 28, 1950

RICHARD A. ROAD

It is hereby certified that error appears in the printed specification of the above numbered patent requiring correction as follows:

Column 2, line 5, for "niclude" read *include*; line 47, for "roatively" read *rotatively*; column 3, line 65, for the word "as" before "groove" read *has*; and that the said Letters Patent should be read as corrected above, so that the same may conform to the record of the case in the Patent Office.

Signed and sealed this 9th day of January, A. D. 1951.

[SEAL]

THOMAS F. MURPHY,
*Assistant Commissioner of Patents.*